United States Patent
Yamashita (10) Patent No.: US 6,574,534 B2
(45) Date of Patent: Jun. 3, 2003

(54) 6-DEGREE-OF-FREEDOM CONTROL APPARATUS FOR SPACECRAFT

(75) Inventor: Toshiaki Yamashita, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/536,812

(22) Filed: Mar. 28, 2000

(65) Prior Publication Data

US 2002/0077732 A1 Jun. 20, 2002

(30) Foreign Application Priority Data

Mar. 30, 1999 (JP) .......................................... 11-089855

(51) Int. Cl.⁷ ............................ B64C 1/00; G05D 1/00; G06F 17/00; B64G 1/22; F02K 1/00
(52) U.S. Cl. ................................ 701/13; 701/3; 701/4; 701/8; 701/27; 244/158 R; 244/164
(58) Field of Search ........................... 701/3, 4, 8, 13, 701/27; 284/158 R, 164, 75 R, 180, 181, 182, 177

(56) References Cited

U.S. PATENT DOCUMENTS

| | | | | |
|---|---|---|---|---|
| 4,358,076 A | * | 11/1982 | Lange et al. ................. | 244/164 |
| 5,311,435 A | * | 5/1994 | Yocum et al. ............... | 244/164 |
| 5,335,179 A | * | 8/1994 | Boka et al. .................. | 244/164 |
| 5,520,359 A | * | 5/1996 | Merhav et al. .......... | 244/158 R |
| 5,608,634 A | * | 3/1997 | Goodzeit et al. .............. | 701/4 |
| 5,610,820 A | * | 3/1997 | Shankar et al. ............... | 701/13 |
| 5,865,402 A | * | 2/1999 | Fischer et al. ............... | 244/166 |
| 5,957,411 A | * | 9/1999 | Liu et al. ..................... | 244/164 |
| 5,992,799 A | * | 11/1999 | Gamble et al. .............. | 244/164 |
| 6,076,772 A | * | 6/2000 | Eyerly et al. ................ | 244/164 |
| 6,113,034 A | * | 9/2000 | Basuthakur et al. ........ | 244/166 |
| 6,126,117 A | * | 10/2000 | Sekine ........................ | 244/176 |
| 6,186,446 B1 | * | 2/2001 | Tilley et al. ................. | 244/164 |
| 6,205,378 B1 | * | 3/2001 | Rodden et al. ............... | 701/13 |
| 6,208,915 B1 | * | 3/2001 | Schutte et al. .......... | 244/158 R |
| 6,339,734 B1 | * | 1/2002 | Liu et al. ..................... | 244/164 |

FOREIGN PATENT DOCUMENTS

| JP | 62059200 | 3/1987 |
|---|---|---|
| JP | 7033095 | 2/1995 |

* cited by examiner

Primary Examiner—Jacques H. Louis-Jacques
Assistant Examiner—Brian J. Broadhead
(74) Attorney, Agent, or Firm—Dickstein, Shapiro, Morin & Oshinsky, LLP.

(57) ABSTRACT

A 6-degree-of-freedom control apparatus for a spacecraft includes a plurality of thrusters, thruster modulator, position/velocity detector, target position/velocity generator, attitude/angular velocity detector, target attitude/angular velocity generator, and 6-degree-of-freedom controller. The thrusters control three position axes and three attitude axes of a spacecraft by jet. The thruster modulator selectively drives the thrusters on the basis of a thruster control signal. The position/velocity detector measures a position and velocity of the spacecraft. The target position/velocity generator generates target position and velocity values of the spacecraft. The attitude/angular velocity detector measures an attitude and angular velocity of the spacecraft. The target attitude/angular velocity generator generates target attitude and angular velocity values of the spacecraft. The 6-degree-of-freedom controller generates the thruster control signal on the basis of a deviation between an output from the position/velocity detector and an output from the target position/velocity generator and a deviation between an output from the attitude/angular velocity detector and an output from the target attitude/angular velocity generator and outputs the signal to the thruster modulator.

9 Claims, 3 Drawing Sheets

6-DEGREE-OF-FREEDOM CONTROL APPARATUS FOR SPACECRAFT

BACKGROUND OF THE INVENTION

The present invention relates to a 6-degree-of-freedom control apparatus for controlling three position axes and three attitude axes, i.e., a total of 6 degrees of freedom of a spacecraft such as an artificial satellite.

Figure 4:
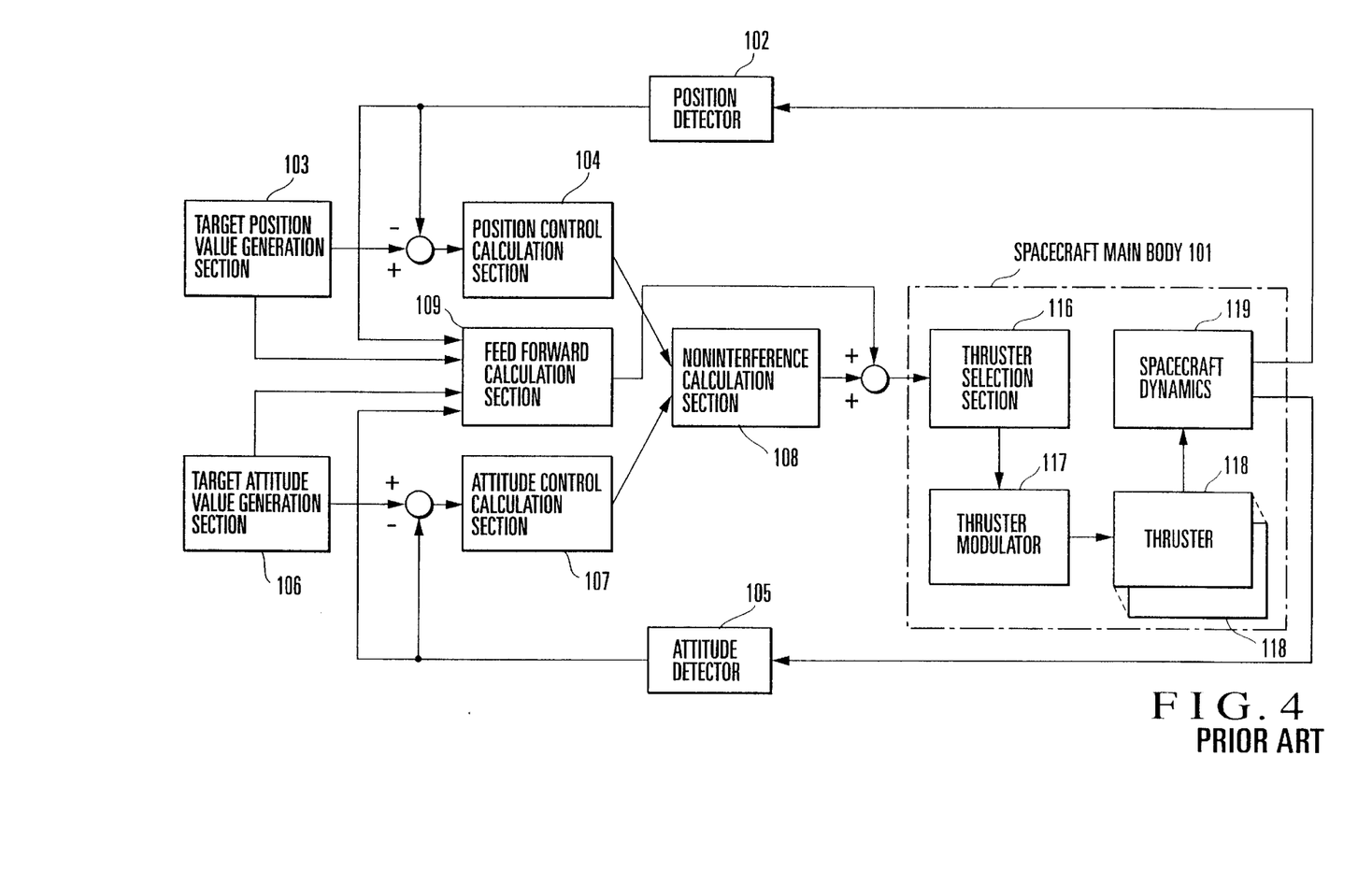
FIG. 4 is a block diagram of a conventional 6-degree-of-freedom control apparatus for a spacecraft.

Conventionally, to dock a spacecraft such as an artificial satellite and another spacecraft, put them into orbit, and maintain a predetermined orbital position, a 6-degree-of-freedom control apparatus controls three position axes and three attitude axes of the spacecraft. FIG. 4 shows a conventional 6-degree-of-freedom control apparatus disclosed in Japanese Patent Laid-Open No. 7-33095 (reference 1).

Referring to FIG. 4, the 6-degree-of-freedom control apparatus comprises a spacecraft main body 101, a position detector 102 for measuring the position of the spacecraft main body 101, a target position value generation section 103 for outputting the target position value of the spacecraft main body 101, a position control calculation section 104 for calculating a control signal associated with position control of the spacecraft main body 101, an attitude detector 105 for measuring the attitude of the spacecraft main body 101, a target attitude value generation section 106 for outputting the target attitude value of the spacecraft main body 101, an attitude control calculation section 107 for calculating a control signal associated with attitude control of the spacecraft main body 101, a noninterference calculation section 108 for eliminating interference on the dynamics on the basis of the calculation results from the position control calculation section 104 and attitude control calculation section 107, and a feedforward calculation section 109 for compensating the acceleration components of the target position and attitude values and the inertial force on the dynamics.

The spacecraft main body 101 comprises a thruster selection section 116 for selecting a combination of thrusters and thruster jet pattern on the basis of an input control signal, a thruster modulator 117 including a thruster driving circuit, a plurality of thrusters 118, and a spacecraft dynamics 119 that changes depending on the thrusts generated by the thrusters 118.

In the 6-degree-of-freedom control apparatus for a spacecraft shown in FIG. 4, the position and attitude of the spacecraft main body 101 are detected by the position detector 102 and attitude detector 105, respectively. The position control calculation section 104 calculates a control signal associated with position control of the spacecraft main body 101 on the basis of the deviation between the output from the position detector 102 and the target position value output from the target position value generation section 103. The attitude control calculation section 107 calculates a control signal associated with attitude control of the spacecraft main body 101 on the basis of the deviation between the output from the attitude detector 105 and the target attitude value output from the target attitude value generation section 106.

The feedforward calculation section 109 calculates a compensation amount for the acceleration components of the target values on the basis of the outputs from the target position value generation section 103 and target attitude value generation section 106. The feedforward calculation section 109 also calculates the compensation amount for the inertial force on the basis of the outputs from the position detector 102 and attitude detector 105. The noninterference calculation section 108 eliminates interference on the dynamics between the control signal output from the position control calculation section 104 and that output from the attitude control calculation section 107. The output from the noninterference calculation section 108 is added to the output from the feedforward calculation section 109 and then output to the thruster selection section 116 mounted in the spacecraft main body 101.

On the basis of the input control signal, the thruster selection section 116 selects a combination of the thrusters 118 and jet pattern simultaneously for a plurality of axes such that the fuel consumption becomes minimum. The thruster modulator 117 actuates the valves of the selected thrusters 118 of the plurality of thrusters 118 to supply fuel in accordance with the thruster control signal output from the thruster selection section 116. With this operation, the thrusters 118 selectively jet, and the position and attitude of the spacecraft main body 101 are freely controlled.

The thruster selection section 116 selects the combination of the thrusters 118 and jet pattern on the basis of a lookup table and realizes an efficient thruster control method capable of minimizing the total fuel jet amount using the offset jet logic or permutation jet logic. The offset jet logic removes an offset jet pattern that nullifies the resultant force and torque by jet of the selected thrusters 118. The permutation jet logic replaces a thruster jet combination with a combination that minimizes the total jet amount, though the resultant force and torque are generated by the selected thrusters 118.

However, in the 6-degree-of-freedom control apparatus shown in FIG. 4, since the thruster selection section 116 distributes the jet to the plurality of thrusters 118 used for axial control in accordance with the control signal generated on the basis of the position and attitude deviations of the spacecraft main body 101, the thrusters 118 need always be switched. However, the individual thrusters 118 mounted on the spacecraft have a large variation in their output characteristics. Additionally, the variation is random.

Hence, in switching the thrusters 118 used for axial control, it is difficult to accurately grasp the influence of the variation in output characteristics between the individual thrusters 118 on the accuracy of axial control. For this reason, it is hard to accurately control the position and attitude of the spacecraft main body 101.

In the 6-degree-of-freedom control apparatus shown in FIG. 4, after all control signals associated with the axes are added, the thruster selection section 116 selects thrusters to be used, and the thruster modulator 117 executes jet modulation in units of thrusters. The thruster selection section 116 optimizes the thrusters to be used in accordance with, e.g., the required thruster jet amount, independently of the state of the spacecraft main body 101. For this reason, the relationship between thruster jet and the axial motion of the spacecraft main body 101 is unclear, and the force generated by thrust jet can hardly be decomposed in units of axes.

Modulation executed by the thruster modulator 117 substantially corresponds to the axial motion of the spacecraft main body 101. In the arrangement shown in FIG. 4 wherein thruster jet and the motion of the spacecraft main body 101 cannot be associated with each other, the modulation logic to be executed by the thruster modulator 117 cannot be set in advance.

In the 6-degree-of-freedom control apparatus shown in FIG. 4, information associated with the velocity/angular velocity of the spacecraft main body 101 is not used for axial control. Hence, for position and attitude control of the spacecraft main body 101, phase lead compensation cannot be achieved, resulting in limited control performance.

In a thruster control method disclosed in Japanese Patent Laid-Open No. 62-59200 (reference 2), for simultaneous control of a plurality of axes, 6-degree-of-freedom control of a spacecraft is realized by simply adding control logic components for individual axes.

However, since the logic components for axial control are only simply added, fuel consumption of thrusters cannot be suppressed.

SUMMARY OF THE INVENTION

It is an object of the present invention to provide a 6-degree-of-freedom control apparatus for a spacecraft, which can simultaneously realize accurate position and attitude control of the spacecraft and suppression of fuel consumption.

In order to achieve the above object, according to the present invention, there is provided a 6-degree-of-freedom control apparatus for a spacecraft, comprising a plurality of thrusters for controlling three position axes and three attitude axes of a spacecraft by jet, thruster driving means for selectively driving the thrusters on the basis of a thruster control signal, position/velocity detection means for measuring a position and velocity of the spacecraft, target position/velocity generation means for generating target values of the position and velocity of the spacecraft, attitude/angular velocity detection means for measuring an attitude and angular velocity of the spacecraft, target attitude/angular velocity generation means for generating target values of the attitude and angular velocity of the spacecraft, and 6-degree-of-freedom control means for generating the thruster control signal on the basis of a deviation between an output from the position/velocity detection means and an output from the target position/velocity generation means and a deviation between an output from the attitude/angular velocity detection means and an output from the target attitude/angular velocity generation means and outputting the thruster control signal to the thruster driving means.

DESCRIPTION OF THE PREFERRED EMBODIMENT

The present invention will be described below in detail with reference to the accompanying drawings.

Figure 1:
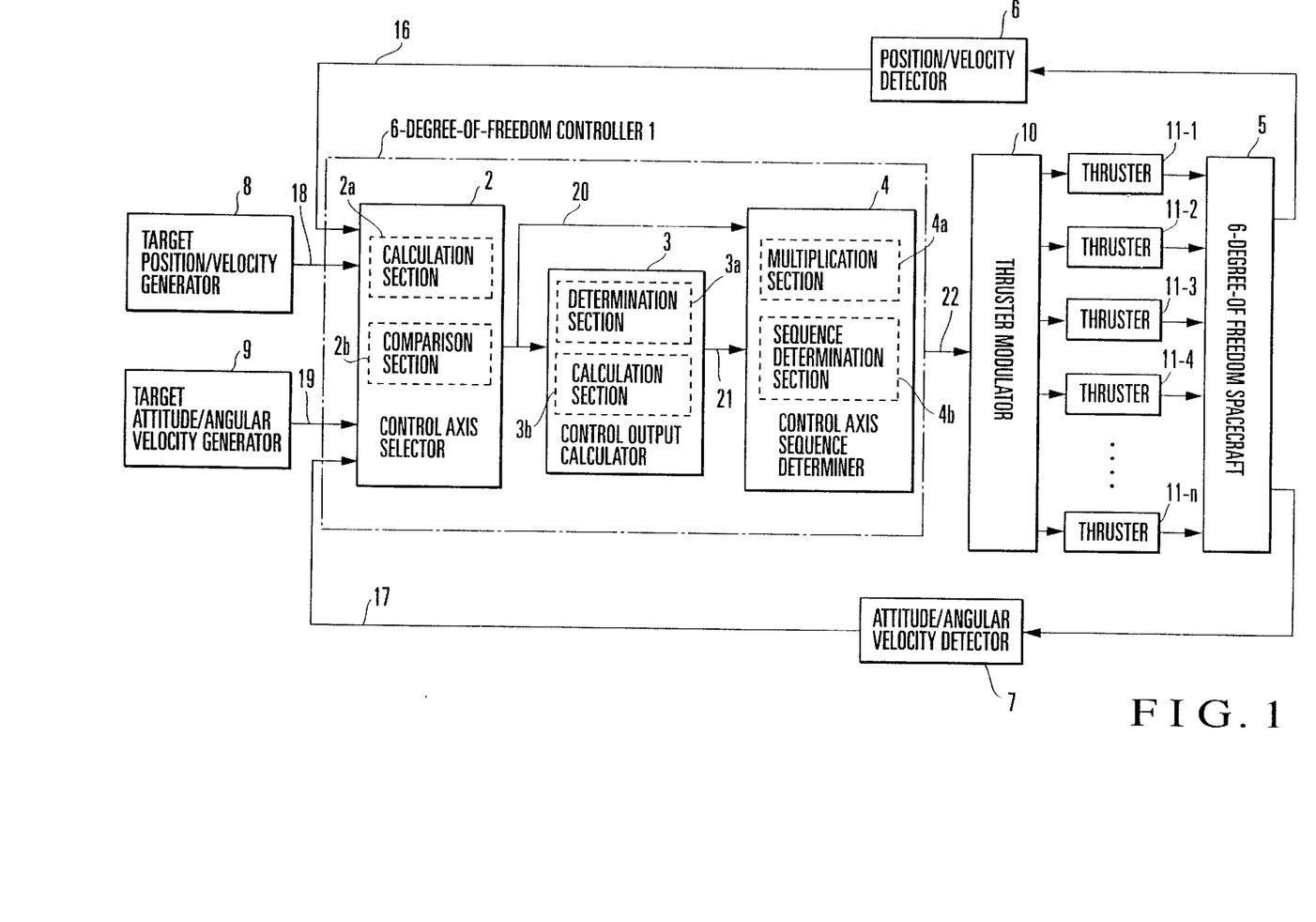
FIG. 1 is a block diagram of a 6-degree-of-freedom control apparatus for a spacecraft according to an embodiment of the present invention.

FIG. 1 shows a 6-degree-of-freedom control apparatus for a spacecraft according to an embodiment of the present invention. Referring to FIG. 1, the 6-degree-of-freedom control apparatus comprises a 6-degree-of-freedom controller 1 for outputting a thruster control signal, a 6-degree-of-freedom spacecraft 5 whose three position axes and three attitude axes (to be described later) are controlled by the 6-degree-of-freedom controller 1, a position/velocity detector 6 for measuring the position and velocity of the 6-degree-of-freedom spacecraft 5, an attitude/angular velocity detector 7 for measuring the attitude and angular velocity of the 6-degree-of-freedom spacecraft 5, a target position/velocity generator 8 for generating target position and velocity values of the 6-degree-of-freedom spacecraft 5, a target attitude/angular velocity generator 9 for generating target attitude and angular velocity values of the 6-degree-of-freedom spacecraft 5, a thruster modulator 10 for selectively driving thrusters on the basis of the thruster control signal from the 6-degree-of-freedom controller 1, and a plurality of thrusters 11-1 to 11-$n$ mounted on the outer surface of the 6-degree-of-freedom spacecraft 5. The thrusters 11-1 to 11-$n$ are driven by the thruster modulator 10 to control the three position axes and three attitude axes of the 6-degree-of-freedom spacecraft 5.

The 6-degree-of-freedom controller 1 has a control axis selector 2 for selecting a control axis on the basis of the outputs from the position/velocity detector 6, attitude/angular velocity detector 7, target position/velocity generator 8, and target attitude/angular velocity generator 9, a control output calculator 3 for calculating a control output on the basis of the output from the control axis selector 2, and a control axis sequence determiner 4 for determining the sequence of control axes on the basis of the outputs from the control axis selector 2 and control output calculator 3.

Reference numeral 16 denotes a position/velocity detection signal output from the position/velocity detector 6 to the control axis selector 2; 17, an attitude/angular velocity detection signal output from the attitude/angular velocity detector 7 to the control axis selector 2; 18, a target position/velocity signal output from the target position/velocity generator 8 to the control axis selector 2; 19, a target attitude/angular velocity signal output from the target attitude/angular velocity generator 9 to the control axis selector 2; 20, a control axis deviation signal output from the control axis selector 2 to the control output calculator 3 and control axis sequence determiner 4; 21, an axial control signal output from the control output calculator 3 to the control axis sequence determiner 4; and 22, a thruster control signal output from the control axis sequence determiner 4 to the thruster modulator 10.

Figure 2:
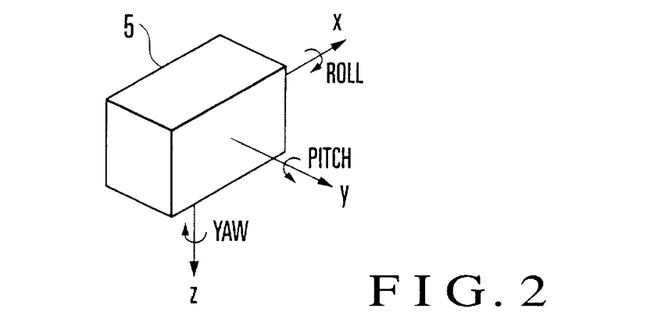
FIG. 2 is a view showing three position axes and three attitude axes of a spacecraft.

As a characteristic feature of this embodiment, the 6-degree-of-freedom controller 1 generates the thruster control signal 22 for each of the three position axes (x-axis, y-axis, and z-axis) and three attitude axes (roll axis, pitch axis, and yaw axis) of the 6-degree-of-freedom spacecraft 5 as shown in FIG. 2. The thruster control signal 22 selectively drives the thrusters 11-1 to 11-$n$ and makes them jet, thereby controlling the position and attitude of the 6-degree-of-freedom spacecraft 5.

First, the position/velocity detector 6 measures the position and velocity of the 6-degree-of-freedom spacecraft 5 and outputs the position/velocity detection signal 16 representing the detected position and velocity to the 6-degree-of-freedom controller 1. The attitude/angular velocity detector 7 measures the attitude and angular velocity of the 6-degree-of-freedom spacecraft 5 and outputs the attitude/angular velocity detection signal 17 representing the detected attitude and angular velocity to the 6-degree-of-freedom controller 1.

The position/velocity detector 6 can be easily implemented by combining a single GPS (Global Positioning System) and a DGPS (Differential Global Positioning System) constructed by a plurality of GPSs. The attitude/ angular velocity detector 7 can be easily implemented by combining a star sensor and gyroscope.

The target position/velocity generator 8 outputs the target position/velocity signal 18 representing the target values of the position and velocity of the 6-degree-of-freedom spacecraft 5. The target attitude/angular velocity generator 9 outputs the target attitude/angular velocity signal 19 representing the target values of the attitude and angular velocity of the 6-degree-of-freedom spacecraft 5.

The control axis selector 2 of the 6-degree-of-freedom controller 1 selects an axial direction of the 6-degree-of-freedom spacecraft 5 for which control is required, on the basis of the deviation between the position/velocity detection signal 16 output from the position/velocity detector 6 and the target position/velocity signal 18 output from the target position/velocity generator 8 or the deviation between the attitude/angular velocity detection signal 17 output from the attitude/angular velocity detector 7 and the target attitude/angular velocity signal 19 output from the target attitude/angular velocity generator 9. As a result of selection, the control axis deviation signal 20 representing a deviation is generated for only the axial direction that requires control and output to the control output calculator 3 and control axis sequence determiner 4.

Upon receiving the control axis deviation signal 20, the control output calculator 3 determines in units of axial directions of the 6-degree-of-freedom spacecraft 5 whether thruster control is to be executed on the basis of the deviation represented by the control axis deviation signal 20. Only for the axial direction for which it is determined that thruster control is required, the axial control signal (manipulated variable) 21 for position control or attitude control is calculated from the control axis deviation signal 20 and output to the control axis sequence determiner 4.

The control axis sequence determiner 4 determines the control sequence of axial directions of the 6-degree-of-freedom spacecraft 5 on the basis of priority predetermined for the three position axes and three attitude axes of the 6-degree-of-freedom spacecraft 5 and the deviation represented by the control axis deviation signal 20, and outputs the axial control signals 21 in units of axes in the determined sequence as thruster control signals 22.

As described above, the thruster control signals 22 are generated in units of axes and sequentially output in accordance with the control sequence. In this embodiment, combinations of the thrusters 11-1 to 11-*n* used for control of the three position axes and three attitude axes of the 6-degree-of-freedom spacecraft 5 are fixed. That is, thrusters to be used for control in a given axial direction of the 6-degree-of-freedom spacecraft 5 are determined in advance.

Upon receiving the thruster control signal 22 for one of the three position axes and three attitude axes of the 6-degree-of-freedom spacecraft 5, the thruster modulator 10 selectively actuates the valves of the thrusters 11-1 to 11-*n* so as to correspond to this axial direction. With this operation, the selected ones of the thrusters 11-1 to 11-*n* receive fuel and jet.

When the above-described thruster control is performed in units of axes, the position and attitude of the 6-degree-of-freedom spacecraft 5 are controlled.

In this embodiment, the position and attitude of the 6-degree-of-freedom spacecraft 5 are controlled while fixing the combinations of the thrusters 11-1 to 11-*n* used for control of the three position axes and three attitude axes of the 6-degree-of-freedom spacecraft 5. Consequently, the influence of output deviation generated between the thrusters 11-1 to 11-*n* can be canceled by feedback control based on the position deviation/velocity deviation and attitude deviation/angular velocity deviation of each axis by the 6-degree-of-freedom controller 1. For this reason, the position and attitude of the 6-degree-of-freedom spacecraft 5 can be accurately controlled independently of the difference in performance between the thrusters 11-1 to 11-*n*.

Additionally in this embodiment, the 6-degree-of-freedom controller 1 is constructed by the control axis selector 2 and control axis sequence determiner 4. The functions of the control axis selector 2 and control axis sequence determiner 4 easily realize high-performance control such as interaxial cooperative control of the three position axes and three attitude axes of the 6-degree-of-freedom spacecraft 5, unlike the conventional controller formed by simply adding the axial components.

The control axis selector 2 of the 6-degree-of-freedom controller 1 will be described next in detail.

The control axis selector 2 has a calculation section 2*a* and comparison section 2*b*. The calculation section 2*a* calculates, in units of axes of the 6-degree-of-freedom spacecraft 5, the deviation (position deviation and velocity deviation) between the position/velocity detection signal 16 output from the position/velocity detector 6 and the target position/velocity signal 18 output from the target position/velocity generator 8 or the deviation (attitude deviation and angular velocity deviation) between the attitude/angular velocity detection signal 17 output from the attitude/angular velocity detector 7 and the target attitude/angular velocity signal 19 output from the target attitude/angular velocity generator 9.

At this time, the calculation section 2*a* calculates the position deviation and velocity deviation for each of the three position axes, i.e., the x-axis, y-axis, and z-axis and the attitude deviation and angular velocity deviation for each of the three attitude axes, i.e., the roll axis, pitch axis, and yaw axis. The comparison section 2*b* compares each of the position deviation, velocity deviation, attitude deviation, and angular velocity deviation calculated by the calculation section 2*a* in units of axes with a corresponding deviation threshold value set in advance and determines whether control is necessary for the axis.

When the position deviation is larger than a predetermined position deviation threshold value, or the velocity deviation is larger than a predetermined velocity deviation threshold value, the control axis selector 2 determines the corresponding axis (x-axis, y-axis, or z-axis) as an axis that requires control. When the attitude deviation is larger than a predetermined attitude deviation threshold value, or the angular velocity deviation is larger than a predetermined angular velocity deviation threshold value, the control axis selector 2 determines the corresponding axis (roll axis, pitch axis, or yaw axis) as an axis that requires control.

The control axis selector 2 outputs the control axis deviation signal 20 for only an axis that is determined as an axis requiring control. More specifically, when it is determined that control is required for the x-axis, y-axis, or z-axis, the control axis selector 2 outputs the control axis deviation signal 20 representing the position deviation and velocity deviation of the corresponding axis. When it is determined that control is required for the roll axis, pitch axis, or yaw axis, the control axis selector 2 outputs the control axis deviation signal 20 representing the attitude deviation and angular velocity deviation of the corresponding axis.

For an axis determined as an axis that requires no control because the deviation is equal to or smaller than the threshold value, the corresponding deviation in the control axis deviation signal 20 becomes 0.

As described above, in this embodiment, since the control axis selector 2 having a control axis selection function is provided in the 6-degree-of-freedom controller 1, a control axis can be adaptively selected in accordance with the magnitude of deviation. In addition, the calculation amount of the control output calculator 3 which operates on the basis of the control axis deviation signal 20 can be decreased. As a consequence, the apparatus can cope with current restriction on equipment of a spacecraft.

The control output calculator 3 of the 6-degree-of-freedom controller 1 will be described next in detail.

The control output calculator 3 has a determination section 3a and calculation section 3b. The determination section 3a determines in units of axes, on a phase plane composed of position deviation and velocity deviation, or attitude deviation and angular velocity deviation in which a controlled region where thruster control must be executed and an uncontrolled region where thruster control must not be executed are set in advance, whether the state of the 6-degree-of-freedom spacecraft 5, which is represented by the position deviation and velocity deviation or attitude deviation and angular velocity deviation in the control axis deviation signal 20, belongs to the controlled region or uncontrolled region. In accordance with the determination result, the calculation section 3b calculates the axial control signal 21 on the basis of the control axis deviation signal 20 for only the axial direction in which the state of the 6-degree-of-freedom spacecraft 5 belongs to the controlled region.

In the control output calculator 3, a two-dimensional phase plane composed of position deviation and velocity deviation having a position deviation 1 and velocity deviation v as coordinate axes perpendicular to each other and a two-dimensional phase plane composed of attitude deviation and angular velocity deviation having an attitude deviation u and angular velocity deviation ω as coordinate axes perpendicular to each other are set in advance.

Figure 3A:
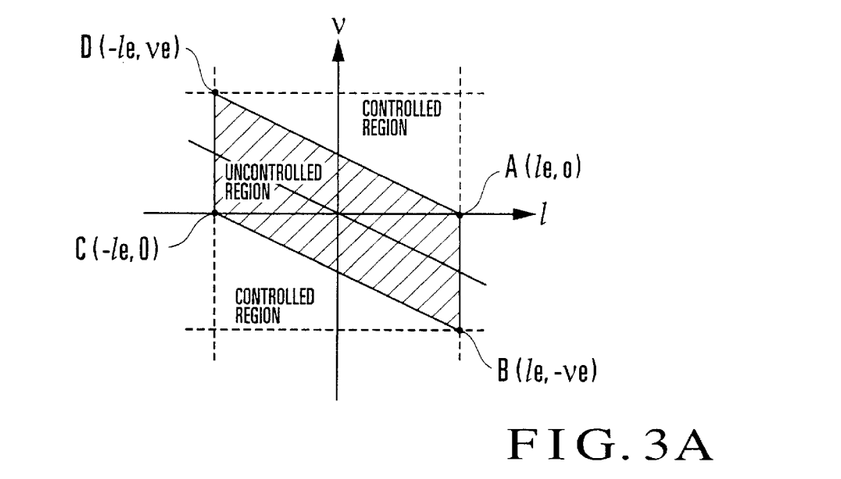
FIGS. 3A and 3B are graphs showing relationships between the position deviation and velocity deviation, and the attitude deviation and angular velocity deviation on the phase plane, respectively.
Figure 3B:
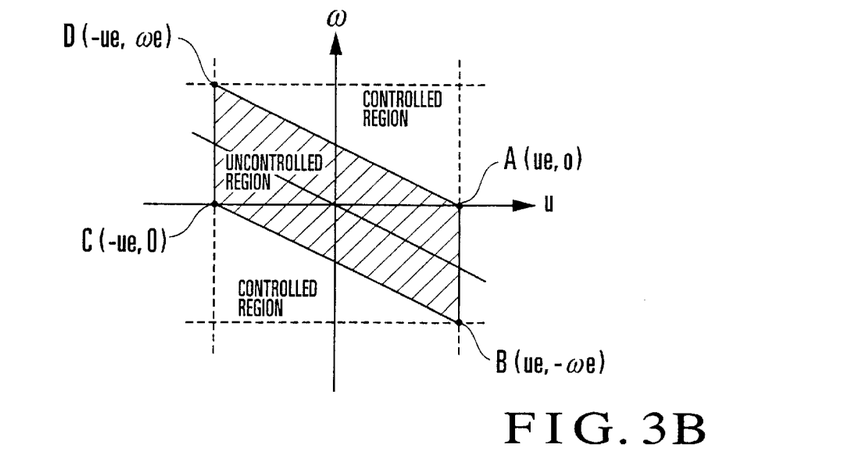

FIG. 3A shows the phase plane of position deviation and velocity deviation. FIG. 3B shows the phase plane of attitude deviation and angular velocity deviation. The phase plane of the position deviation and velocity deviation is set for each of the three position axes, i.e., the x-axis, y-axis, and z-axis. The phase plane of the attitude deviation and angular velocity deviation is set for each of the three attitude axes, i.e., the roll axis, pitch axis, and yaw axis.

The uncontrolled region indicated by a hatched portion in FIG. 3A is set, on the basis of a maximum position deviation le and maximum velocity deviation vc defined by control specifications of the 6-degree-of-freedom spacecraft 5, within a region defined by connecting a point A (le,0), point B (le,−ve), point C (−le,0), and point D (−le,ve) by straight lines. In the phase plane of the position deviation and velocity deviation shown in FIG. 3A, the controlled region is set outside the uncontrolled region.

Similarly, the uncontrolled region indicated by a hatched portion in FIG. 3B is set, on the basis of a maximum attitude deviation ue and maximum angular velocity deviation ωe defined by control specifications of the 6-degree-of-freedom spacecraft 5, within a region defined by connecting a point A (ue,0), point B (ue,−ωe), point C (−ue,0), and point D (−ue, ωe) by straight lines. In the phase plane of the attitude deviation and angular velocity deviation shown in FIG. 3B, the controlled region is set outside the uncontrolled region.

Generally, for the thrusters 11-1 to 11-n used to control the three position axes and three attitude axes of the 6-degree-of-freedom spacecraft 5, only nonlinear control (binary control) for ON/OFF-controlling thruster valves is possible. For this reason, the axial control signal 21 must be output while setting an appropriate dead zone in the control axis deviation signal 20 representing the position deviation/ velocity deviation or attitude deviation/angular velocity deviation detected as the state of the 6-degree-of-freedom spacecraft 5. This prevents the thrusters 11-1 to 11-n from always operating and wasting fuel.

If the 6-degree-of-freedom spacecraft 5 has a flexible structure, the 6-degree-of-freedom spacecraft 5 vibrates at high possibility due to repetitive jet by the thrusters 11-1 to 11-n, resulting in unstable position and attitude of the 6-degree-of-freedom spacecraft 5. To stabilize the position and attitude of the 6-degree-of-freedom spacecraft 5, the thrusters 11-1 to 11-n must be re-actuated, resulting in an increase in fuel consumption by the thrusters 11-1 to 11-n.

To solve this problem, on the basis of the control specifications required by the user of the 6-degree-of-freedom spacecraft 5, an uncontrolled region is set on the phase plane of the position deviation and velocity deviation shown in FIG. 3A or the attitude deviation and angular velocity deviation shown in FIG. 3B, and this uncontrolled region is used as the dead zone of thruster control. The uncontrolled region is set on each phase plane of three position deviation and velocity deviation corresponding to the x-axis, y-axis, and z-axis. The uncontrolled region is also set on each phase plane of three attitude deviation and angular velocity deviation corresponding to the roll axis, pitch axis, and yaw axis.

The current state associated with each axial direction of the 6-degree-of-freedom spacecraft 5 is represented by the control axis deviation signal 20 output from the control axis selector 2. The state associated with each axial direction indicates one point on the phase plane of position deviation and velocity deviation, or attitude deviation and angular velocity deviation corresponding to the corresponding axis. For example, the position deviation and velocity deviation represented by the control axis deviation signal 20 for the x-axis indicate one point on the phase plane of the position deviation and velocity deviation corresponding to the x-axis. The attitude deviation and angular velocity deviation for the roll axis indicate one point on the phase plane of the attitude deviation and angular velocity deviation corresponding to the roll axis.

The control output calculator 3 determines in units of axes whether the current state of the 6-degree-of-freedom spacecraft 5, which is represented by the control axis deviation signal 20, is in the controlled region or uncontrolled region on the phase plane of the position deviation and velocity deviation, or attitude deviation and angular velocity deviation. The control output calculator 3 calculates the axial control signal (manipulated variable) 21 for only an axial direction in which the state of the 6-degree-of-freedom spacecraft 5 belongs to the controlled region on the basis of the control axis deviation signal 20 of the corresponding axis. No axial control signal 21 is calculated for an axial direction in which the state of the 6-degree-of-freedom spacecraft 5 belongs to the uncontrolled region.

For example, assume that the z-axis is selected by the control axis selector 2 as an axis that requires control, and the position deviation and velocity deviation represented by the control axis deviation signal 20 for the z-axis indicate one point on the phase plane of the position deviation and velocity deviation corresponding to the z-axis. In this case, the control output calculator 3 determines that the z-axis requires thruster control and calculates the axial control signal 21 associated with the z-axis from the position deviation and velocity deviation represented by the control axis deviation signal 20 for the z-axis.

Similarly, assume that the roll axis is selected by the control axis selector 2 as an axis that requires control, and the attitude deviation and angular velocity deviation represented by the control axis deviation signal 20 for the roll axis indicate one point on the phase plane of the attitude deviation and angular velocity deviation corresponding to the roll axis. In this case, the control output calculator 3 determines that the roll axis requires thruster control and calculates the axial control signal 21 associated with the roll axis from the attitude deviation and angular velocity deviation represented by the control axis deviation signal 20 for the roll axis.

When the uncontrolled region on the phase plane of the position deviation and velocity deviation as shown in FIG. 3A or the uncontrolled region on the phase plane of the attitude deviation and angular velocity deviation as shown in FIG. 3B is set in consideration of the flexible structure characteristics or thruster fuel consumption of the 6-degree-of-freedom spacecraft 5, improvement of position and attitude control of the 6-degree-of-freedom spacecraft 5 and minimization of fuel consumption of the thrusters 11-1 to 11-$n$ can be easily simultaneously realized.

The control axis sequence determiner 4 of the 6-degree-of-freedom controller 1 will be described below in detail.

The control axis sequence determiner 4 has a multiplication section 4$a$ and sequence determination section 4$b$. The multiplication section 4$a$ multiples a weight value representing predetermined priority of each axial direction of the 6-degree-of-freedom spacecraft 5 by the deviation represented by the control axis deviation signal 20 in units of corresponding axial directions. The sequence determination section 4$b$ determines the control sequence of the axial directions of the 6-degree-of-freedom spacecraft 5 on the basis of the multiplication result from the multiplication section 4$a$ and outputs the axial control signals 21 for the respective axes in the determined sequence as the thruster control signals 22.

In this embodiment, as weight values for the three position axes and three attitude axes of the 6-degree-of-freedom spacecraft 5, "6" is set for z-axis translation, "5" for x-axis rotation (roll axis), "4" for y-axis rotation (pitch axis), "3" for x-axis translation, "2" for y-axis translation, and "1" for z-axis rotation (yaw axis). As the weight value becomes large, priority for thruster control rises.

In this embodiment, axes represented by the control axis deviation signals 20 and requiring control, i.e., axes selected by the control axis selector 2 are the x-axis, y-axis, and z-axis. Deviation ratios xe, ye, and ze of the x-axis, y-axis, and z-axis are given by $$xe=|lx/lcx|+|vx/vcx| \quad (1)$$

$$ye=|ly/lcy|+|vy/vcy| \quad (2)$$

$$ze=|lz/lcz|+|vz/vcz| \quad (3)$$

In equations (1) to (3), lx, ly, and lz are position deviations represented by the control axis deviation signals 20 for the x-axis, y-axis, and z-axis, vx, vy, and vz are velocity deviations represented by the control axis deviation signals 20, lcx, lcy, and lcz are position deviations required by the control specifications of the 6-degree-of-freedom spacecraft 5 for the x-axis, y-axis, and z-axis, and vcx, vcy, and vcz are velocity deviations required by the control specifications for the x-axis, y-axis, and z-axis.

Deviation ratios re, pe, and ae of the roll axis, pitch axis, and yaw axis are given by $$re=|ur/ucr|+|\omega r/\omega cr| \quad (4)$$

$$pe=|up/ucp|+|\omega p/\omega cp| \quad (5)$$

$$ae=|ua/uca|+|\omega a/\omega ca| \quad (6)$$

In equations (4) to (6), ur, up, and ua are attitude deviations represented by the control axis deviation signals 20 for the roll axis, pitch axis, and yaw axis, $\omega$r, $\omega$p, and $\omega$a are angular velocity deviations represented by the control axis deviation signals 20 for the roll axis, pitch axis, and yaw axis, ucr, ucp, and uca are attitude deviations required by the control specifications, and $\omega$cr, $\omega$cp, and $\omega$ca are angular velocity deviations required by the control specifications for the roll axis, pitch axis, and yaw axis.

The deviation ratios xe, ye, ze, re, pe, and ae represent ratios of axial deviations to the control specifications. The control axis sequence determiner 4 uses, as final weight values, values obtained by multiplying the above-described weight values by the deviation ratios xe, ye, ze, re, pe, and ae in units of corresponding axes.

In this embodiment, since the axes selected by the control axis selector 2 are x-axis, y-axis, and z-axis, all deviations (attitude deviation and angular velocity deviation) represented by the control axis deviation signals 20 for the remaining roll axis, pitch axis, and yaw axis are 0. Hence, as final weight values for the three position axes and three attitude axes of the 6-degree-of-freedom spacecraft 5, 6$ze$ is used for z-axis translation, 3$xe$ for x-axis translation, 2$ye$ for y-axis translation, 0 for x-axis rotation (roll axis), 0 for y-axis rotation (pitch axis), and 0 for z-axis rotation (yaw axis).

The control axis sequence determiner 4 determines the control sequence of the axes of the 6-degree-of-freedom spacecraft 5 in accordance with priority represented by the calculated weight values. In this embodiment, control is performed sequentially for the z-axis, x-axis, y-axis, roll axis, pitch axis, and yaw axis (only when 6$ze$>3$xe$>2$ye$). The control axis sequence determiner 4 outputs the axial control signals 21 for the respective axes in the determined sequence as the thruster control signals 22.

More specifically, the axial control signal 21 associated with the z-axis is output first as the thruster control signal 22. The axial control signals 21 associated with the x-axis and axial control signal 21 associated with the y-axis are sequentially output. For the roll axis, pitch axis, and yaw axis, the deviations represented by the control axis deviation signals 20 are 0, and manipulated variables represented by the axial control signals 21 are 0. Hence, the thruster control signals 22 are also 0 (alternatively, no thruster control signals are output).

As described above, when the control axis sequence determiner 4 is provided, an axis having large deviation from the target value and high priority is actively controlled. Hence, the overall performance of the 6-degree-of-freedom spacecraft 5 can be improved.

Note that in equations (1) to (6), deviation ratios are used in place of deviations because priority can be determined using position deviation, velocity deviation, attitude deviation, and angular velocity deviation with unified units.

According to the present invention, the position/velocity detector, target position/velocity generator, attitude/angular velocity detector, target attitude/angular velocity generator, and 6-degree-of-freedom controller are used. The 6-degree-of-freedom controller is constructed by the control axis selector, control output calculator, and control axis sequence determiner. With this arrangement, the thruster control signal is generated on the basis of the position deviation, velocity deviation, attitude deviation, and angular velocity deviation of the 6-degree-of-freedom spacecraft, thereby controlling the position and attitude of the 6-degree-of-freedom spacecraft. For this reason, unlike the conventional 6-degree-of-freedom control apparatus which uses no information associated with the velocity/angular velocity of the spacecraft, the position and attitude of the 6-degree-of-freedom spacecraft can be accurately controlled.

The position and attitude of the 6-degree-of-freedom spacecraft can be efficiently controlled by evaluating whether each axis requires control, on the basis of the position deviation, velocity deviation, attitude deviation, and angular velocity deviation, and adaptively changing the control sequence of the axial directions. For this reason, the position accuracy and attitude accuracy of the 6-degree-of-freedom spacecraft can be made high, and simultaneously, fuel consumption of the thrusters can be suppressed.

Since the thruster control signals are generated in units of axial directions of the 6-degree-of-freedom spacecraft, the 6-axis control thruster modulator already used for the current 6-degree-of-freedom spacecraft can be directly applied, and a spacecraft using the 6-degree-of-freedom control apparatus of the present invention can be easily realized.

The control output calculator determines, in units of axial directions of the 6-degree-of-freedom spacecraft, whether the state of the 6-degree-of-freedom spacecraft, which is represented by the position deviation and velocity deviation or attitude deviation and angular velocity deviation in the control axis deviation signal, belongs to the controlled region or uncontrolled region on the phase plane of the position deviation and velocity deviation, or attitude deviation and angular velocity deviation in which the controlled region where thruster control must be executed and the uncontrolled region where thruster control must not be executed are set in advance, and calculates the axial control signal on the basis of the control axis deviation signal for only an axial direction in which the state of the 6-degree-of-freedom spacecraft belongs to the controlled region. Since a control axis can be adaptively selected in accordance with the magnitude of deviation, wasteful fuel consumption of the thrusters can be suppressed. Additionally, the calculation amount of the control output calculator which operates on the basis of the control axis deviation signal can be decreased.

The control output calculator determines, in units of axial directions of the 6-degree-of-freedom spacecraft, whether the state of the 6-degree-of-freedom spacecraft, which is represented by the position deviation and velocity deviation or attitude deviation and angular velocity deviation in the control axis deviation signal, belongs to the controlled region or uncontrolled region on the phase plane of the position deviation and velocity deviation, or attitude deviation and angular velocity deviation in which the controlled region where thruster control must be executed and the uncontrolled region where thruster control must not be executed are set in advance, and calculates the axial control signal on the basis of the control axis deviation signal for only an axial direction in which the state of the 6-degree-of-freedom spacecraft belongs to the controlled region. Since repetitive jet by the thrusters can be suppressed, the position accuracy and attitude accuracy of the 6-degree-of-freedom spacecraft can be improved, and simultaneously, fuel consumption of the thrusters can be suppressed.

When the uncontrolled region on the phase plane of the position deviation and velocity deviation, or attitude deviation and angular velocity deviation is set in accordance with the flexible structure of the 6-degree-of-freedom spacecraft or thruster fuel consumption, the 6-degree-of-freedom spacecraft can be prevented from vibrating, and wasteful fuel consumption of the thrusters can be suppressed.

The control axis sequence determiner multiples a weight value representing predetermined priority of each axial direction of the 6-degree-of-freedom spacecraft by the deviation represented by the control axis deviation signal in units of corresponding axial directions. The control sequence of the axial directions of the 6-degree-of-freedom spacecraft is determined on the basis of the multiplication result, and the axial control signals for the respective axes are output as thruster control signals in the determined sequence. Since an axial direction having large deviation from the target value and high priority is preferentially controlled, the position accuracy and attitude accuracy of the 6-degree-of-freedom spacecraft can be improved, and the overall performance of the 6-degree-of-freedom spacecraft can be improved.

What is claimed is:

1. A 6-degree-of-freedom control apparatus for a spacecraft, comprising:

a plurality of thrusters for controlling three position axes and three attitude axes of a spacecraft by jet;

a thruster modulator for selectively driving said thrusters on the basis of a thruster control signal;

a position/velocity detector for measuring a position and velocity of said spacecraft;

a target position/velocity generator for generating target values of the position and velocity of said spacecraft;

an attitude/angular velocity detector for measuring an attitude and angular velocity of said spacecraft;

a target attitude/angular velocity generator for generating target values of the attitude and angular velocity of said spacecraft;

a 6-degree-of-freedom controller for generating the thruster control signal on the basis of a deviation between an output from said position/velocity detector and an output from said target position/velocity generator and a deviation between an output from said attitude/angular velocity detector and output from said target attitude/angular velocity generator and outputting the thruster control signal to said thruster modulator, wherein the 6-degree-of-freedom controller thereby controls said thrusters to minimize vibrations of a flexible structure on said spacecraft; and control access sequence determination means for determining a control sequence of axial directions of the spacecraft on the basis of priorities set in advance for the three position axes and three attitude axes of the spacecraft and a deviation represented by a control axis deviation signal from a control axis selection means.

2. A 6-degree-of-freedom control apparatus for a spacecraft, comprising:

a plurality of thrusters for controlling three position axes and three attitude axes of a spacecraft by jet;

thruster modulator for selectively driving said thrusters on the basis of a thruster control signal;

a position/velocity detector for measuring a position and velocity of said spacecraft;

a target position/velocity generator for generating target values of the position and velocity of said spacecraft;

an attitude/angular velocity detector for measuring an attitude and angular velocity of said spacecraft;

a target attitude/angular velocity generator for generating target values of the attitude and angular velocity of said spacecraft; and a 6-degree-of-freedom controller for generating the thruster control signal and outputting the thruster control signal to said thruster modulator, wherein said 6-degree-of-freedom controller comprises a control axis selector for selecting an axial direction of said spacecraft on the basis of a deviation between an output from said position/velocity detector and an output from said target position/velocity generator and a deviation between an output from said attitude/angular velocity detector and an output from said target attitude/velocity generator and outputting a control axis deviation signal for only an axial direction that requires control, a control output calculator for determining, in units of axial directions of said spacecraft, whether thruster control is to be executed on the basis of a deviation represented by the control axis deviation signal from said control axis selector and calculating an axial control signal associated with position control and attitude control from the control axis deviation signal for only an axial direction for which it is determined that thruster control need be executed, and a control axis sequence determiner for determining a control sequence of axial directions of said spacecraft on the basis of priority set in advance for the three position axes and three attitude axes of said spacecraft and a deviation represented by the control axis deviation signal from said control axis selector, and outputting the axial control signals for the respective axes in the determined sequence as thruster control signals.

3. An apparatus according to claim 2, wherein said control axis selector comprises a calculation section for calculating the deviation between the output from said position/velocity detector and the output from said target position/velocity generator and the deviation between the output from said attitude/angular velocity detector and the output from said target attitude/angular velocity generator in units of axial directions of said spacecraft, and a comparison section for comparing each of position deviation, velocity deviation, attitude deviation, and angular velocity deviation from said calculation means with a corresponding deviation threshold value set in advance, wherein the control axis deviation signal representing the deviation is output to said control output calculator for only an axial direction of said spacecraft for which the deviation larger than the deviation threshold value is detected.

4. An apparatus according to claim 2, wherein said control output calculator comprises a determination section for determining, in units of axial directions of said spacecraft, whether a state of said spacecraft, which is represented by position deviation and velocity deviation or attitude deviation and angular velocity deviation in the control axis deviation signal, belongs to a controlled region or an uncontrolled region on a phase plane of a position deviation and velocity deviation, or attitude deviation and angular deviation in which the controlled region where thruster control must be executed and the uncontrolled region where thruster control does not have to be executed are set in advance, and a calculation section for calculating the axial control signal on the basis of the control axis deviation signal for only an axial direction in which the state of said spacecraft belongs to the controlled region.

5. An apparatus according to claim 4, wherein the uncontrolled region on the phase plane of the position deviation and velocity deviation, or attitude deviation and angular velocity deviation is set in accordance with a flexible structure of said spacecraft or thruster fuel consumption.

6. An apparatus according to claim 2, wherein said control axis sequence determiner comprises a multiplication section for multiplying a weight value representing priority set in advance for each axial direction of said spacecraft by the deviation represented by the control axis deviation signal in units of corresponding axial directions, and a sequence determination section for determining the control sequence of the axial directions of said spacecraft on the basis of a multiplication result from said multiplication section, wherein the axial control signals for the respective axes are output to said thruster modulator in the sequence determined by said sequence determination section.

7. An apparatus according to claim 2, wherein the three position axes are an x-axis, y-axis, and z-axis, and the three attitude axes are a roll axis, pitch axis, and yaw axis.

8. An apparatus according to claim 2 wherein said 6-degree-of-freedom controller generates said control signal on the basis of a deviation between an output from said position/velocity detector and an output from said target position/velocity generator and a deviation between said attitude/angular velocity detector and an output from said attitude/angular velocity generator, wherein said 6-degree-of-freedom controller further comprises:

a determination section for determining, in units of axial directions of said spacecraft, whether a state of said spacecraft, which is represented by position deviation and velocity deviation or attitude deviation and angular velocity deviation in the control axis deviation signal, belongs to a controlled region or an uncontrolled region on a phase plane of a position deviation and velocity deviation, or attitude deviation and angular deviation in which the controlled region where thruster control must be executed and the uncontrolled region where thruster control does not have to be executed are set in advance in accordance with at least the structure of the spacecraft; and a calculation section for calculating the axial control signal on the basis of the control axis deviation signal for only an axial direction in which the state of the spacecraft belongs in the controlled region, wherein the thruster control signal is generated on the basis of the control axis deviation signal from said control axis selector and the axial control signal from said control output calculator.

9. An apparatus according to claim 8 wherein the uncontrolled region is set in accordance with the structure of the spacecraft and thruster fuel consumption.

* * * * *